(12) United States Patent  
Bunnell

(10) Patent No.: US 7,038,678 B2  
(45) Date of Patent: May 2, 2006

(54) DEPENDENT TEXTURE SHADOW ANTIALIASING

(75) Inventor: Michael Todd Bunnell, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 427 days.

(21) Appl. No.: 10/442,457

(22) Filed: May 21, 2003

(65) Prior Publication Data

US 2004/0233195 A1 Nov. 25, 2004

(51) Int. Cl.  
G06T 15/00 (2006.01)

(52) U.S. Cl. .................. 345/426; 345/589; 359/465

(58) Field of Classification Search ............... 345/419, 345/426, 427, 589; 359/465  
See application file for complete search history.

(56) References Cited

U.S. PATENT DOCUMENTS 4,172,632 A * 10/1979 Holmes, Jr. .................. 359/465  
6,704,025 B1 * 3/2004 Bastos et al. ................ 345/589

OTHER PUBLICATIONS

Hardware-accelerated Rendering of Antialiased Shadows with Shadow Maps, Computer Graphics Group, Jul. 2001, pp. 1-6.

Hardware Shadow Mapping, Cass Everitt, Nvidia Corporation, 10 pages, Mar. 2003, pp. 1-10.

Second-Depth Shadow Mapping, Yulan Wang and Steven Molnar, Department of Computer Science, University of North Carolina, 1994, pp. 1-8.

Perspective Shadow Maps, Marc Stamminger and George Drettakis, Reves-Inria Sophia-Antipolis, France, Proceedings of ACM SIGGRAPH 2002, Jul. 2002, pp. 1-6.

Rendering Atiliased Shadows with Depth Maps, William T. Reeves, David H. Salesin, Robert L. Cook, Pixar, San Rafael, CA. Computer Graphics, vol. 21, No. 4, Jul. 1987, pp. 283-291.

* cited by examiner

Primary Examiner—Phu K. Nguyen  
(74) Attorney, Agent, or Firm—Patterson & Sheridan, LLP

(57) ABSTRACT

Antialiasing shadows using a programmable graphics processor. Shadows are antialiased using dependent texture mapping to displace shadow map coordinates. A jitter texture is applied to an object in screen space using non-perspective corrected jitter texture coordinates. The jitter texture coordinates are used to read texture coordinate displacements stored as the jitter texture. The texture coordinate displacements are combined with the shadow, map coordinates to generate displaced shadow map coordinates. The displaced shadow map coordinates are used to read depth values stored as the shadow map. The depth values read from the shadow map are compared with corresponding depth values of the object in light source coordinate space to determine whether each fragment within the object is either "in shadow" or "out of shadow".

35 Claims, 12 Drawing Sheets

DEPENDENT TEXTURE SHADOW ANTIALIASING

FIELD OF THE INVENTION

The present invention relates to, graphics processors and more particularly to method and apparatus for antialiasing shadows.

BACKGROUND

Conventional techniques for rendering shadows using a graphics processor include using shadow maps. Shadow maps are stored in memory at a fixed resolution. When the distance from a viewpoint, e.g., camera, to a shadow decreases magnified shadow edges appear aliased, i.e. jagged, due to insufficient resolution of the shadow map. This type of aliasing is referred to as "perspective aliasing". Storing the shadow maps at a high resolution will reduce the perspective aliasing, but requires more memory space for storing the high resolution shadow map. Computationally intensive techniques such as supersampling and accumulation buffer rendering may be used to antialias an image including shadows. Another type of aliasing, projection aliasing, results from light rays that are nearly parallel to the shadowed surface stretching a shadow along the surface. Using a high resolution shadow map is not sufficient to significantly reduce project aliasing because the stretching may be infinite.

Accordingly, it would be desirable to render antialiased magnified shadows without using shadow maps stored at a high resolution rather than using a lower resolution shadow map.

SUMMARY

Various embodiments of the invention include systems and methods for antialiasing shadows using a programmable graphics processor. A method for antialiasing a shadow includes using jitter map coordinates to obtain shadow map coordinate displacements, producing modified shadow map coordinates by combining the shadow map coordinate displacements and shadow map coordinates, and using the modified shadow map coordinates to obtain a shadow depth value.

A method for producing jitter map coordinates for accessing shadow map coordinate displacements includes receiving object space jitter map coordinates, producing eye space jitter map coordinates by transforming the object space jitter map coordinates, producing normalized device space jitter map coordinates by transforming the eye space jitter map coordinates, and producing the jitter map coordinates for accessing the shadow map coordinate displacements by scaling the normalized device space jitter map coordinates.

A shader program for antialiasing shadows including program instructions to read a number of shadow map coordinate displacements for a fragment, program instructions to modify shadow map coordinates for the fragment using the shadow map coordinate displacements and produce modified shadow map coordinates, and program instructions to read shadow map depths from a shadow map using the modified shadow map coordinates.

An apparatus for antialiasing a shadow includes memory for storing shadow map data and shadow map coordinate displacement data and a texture unit configured to read a portion of the shadow map coordinate displacement data and to read a portion of the shadow map data from the memory using the portion of the shadow map coordinate displacement data read.

Alternatively, an apparatus for antialiasing a shadow includes means for reading shadow map coordinate displacement data stored in a memory, means for computing addresses to read shadow map data from the memory using a portion of the shadow map coordinate displacement data, and means for reading the shadow map data stored in the memory to obtain shadow map depths.

A computing system includes a host processor, a host memory, the host memory storing programs for the host processor, a system interface configured to interface with the host processor, and a programmable graphics processor. The programmable graphics processor includes memory for storing shadow map data and shadow map coordinate displacement data and a fragment shader. The fragment shader is configured to read a portion of the shadow map coordinate displacement data and to read a portion of the shadow map data from the memory using the portion of the shadow map coordinate displacement data read.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
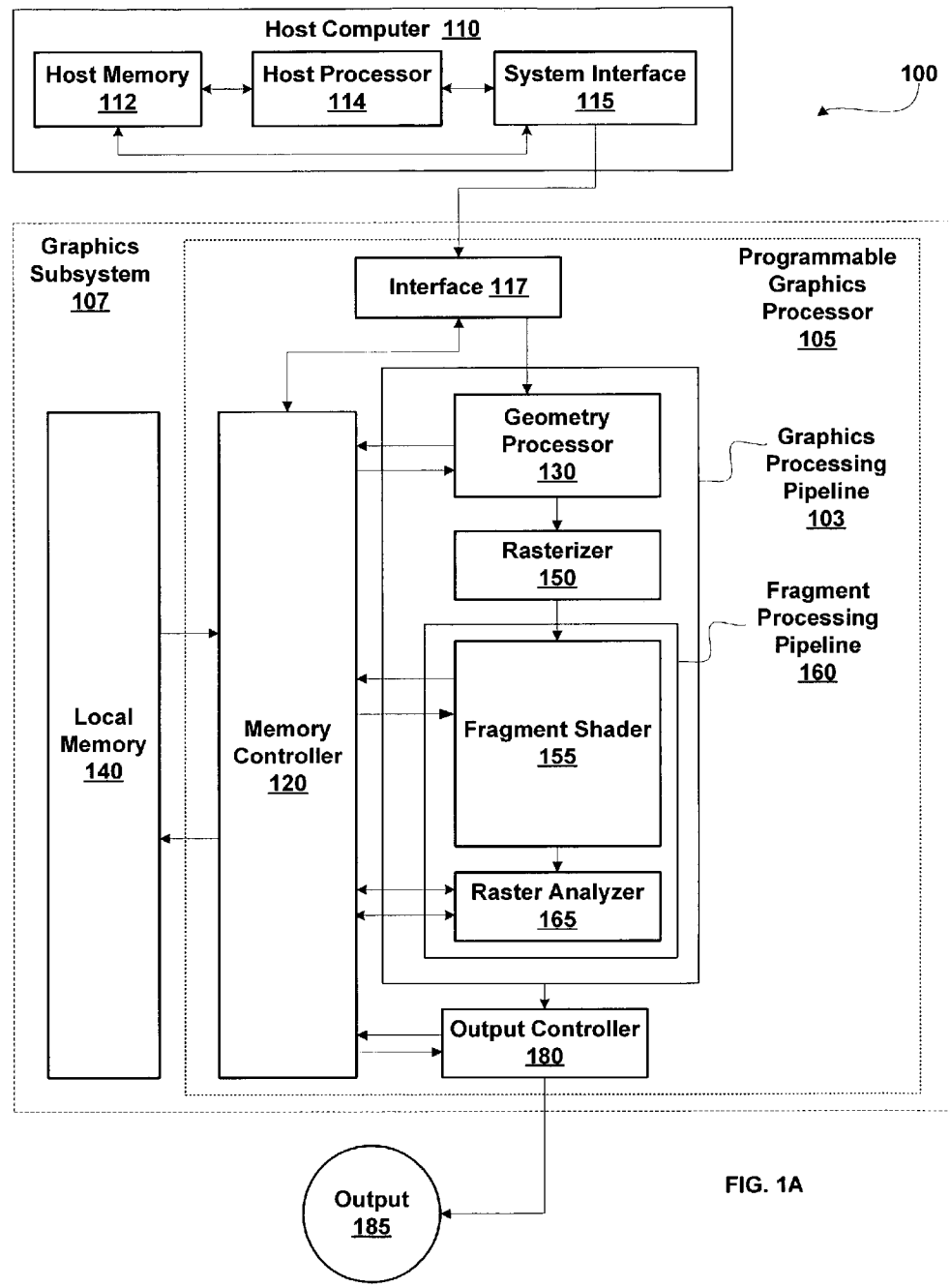
FIG. 1A is a block diagram of an exemplary embodiment of a respective computer system in accordance with one or more aspects of the present invention.

FIG. 1A is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory can include portions of Host Memory 112, Local Memory 140 directly coupled to Programmable Graphics Processor 105, register files coupled to the computation units within Programmable Graphics Processor 105, and the like.

In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through a Memory Interface 125 within Memory Controller 120. Memory Interface 125 includes read interfaces and write interfaces that each generate address and control signals to Local Memory 140, storage resources, and Interface 117. Storage resources can include register files, caches, FIFOs (first in first out), and the like. In addition to communicating with Local Memory 140, and Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Analyzer 165.

Vertex programs are sequences of vertex program instructions compiled by Host Processor 114 for execution within Geometry Processor 130 and Rasterizer 150. Shader programs are sequences of shader program instructions compiled by Host Processor 114 for execution within Fragment Processing Pipeline 160. Geometry Processor 130 receives a stream of program instructions (vertex program instructions and shader program instructions) and data from Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory, e.g., portions of Host Memory 112, Local Memory 140, or storage resources within Programmable Graphics Processor 105. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, such as pixel data or fragment data. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 outputs fragment data or pixel data and shader program instructions to Fragment Processing Pipeline 160. Each fragment is at least a portion of a pixel. Therefore the shader programs configure Fragment Processing Pipeline 160 to operate on fragment or pixel digital image data. For simplicity, the remainder of this description will use the term fragment data to refer to pixel data and fragment data.

The shader programs configure the Fragment Processing Pipeline 160 to process fragment data by specifying computations and computation precision. Fragment Shader 155 optionally is configured by shader program instructions such that fragment data processing operations are performed in multiple passes within Fragment Shader 155. Fragment Shader 155 outputs processed fragment data and codewords generated from shader program instructions to Raster Analyzer 165. Raster Analyzer 165 includes a read interface and a write interface to Memory Controller 120 through which Raster Analyzer 165 accesses data stored in Local Memory 140 or Host Memory 112. Raster Analyzer 165 optionally performs near and far plane clipping and raster operations, such as stencil, z test, blending, and the like, using the fragment data and pixel data stored in Local Memory 140 or Host Memory 112 at the x,y location associated with the combined fragment data. The output data from Raster Analyzer 165 is written back to Local Memory 140 or Host Memory 112 at the x,y locations associated with the output data.

In various embodiments Memory Controller 120, Local Memory 140, and Geometry Processor 130 are configured such that data generated at various points along Graphics Processing Pipeline 103 can be output via Raster Analyzer 165 and provided to Geometry Processor 130 or Fragment Shader 155 as input. The output data is represented in one or more formats as specified by the codewords. For example, color data may be written as 16, 32, 64, or 128 bit per pixel fixed or floating-point RGBA (red, green, blue, and alpha) to be scanned out for display. Specifically, four 16 bit floating point components (RGBA) are combined forming 64 bits of color data for each fragment. The output data, e.g., color, depth, and other parameters, may be stored in graphics memory to be used as a texture map by a shader program executed in a subsequent pass through Fragment Processing Pipeline 160 or through Graphics Processing Pipeline 103. Alternatively, color and depth output data may be written, and later read and processed by Raster Analyzer 165 to generate the final pixel data prior to being scanned out for display via Output Controller 180.

When processing is completed, an Output 185 of Graphics Subsystem 107 is provided using Output Controller 180. Alternatively, Host Processor 114 reads the composited frame stored in Local Memory 140 through Memory Controller 120, Interface 117 and System Interface 115. Output Controller 180 is optionally configured by opcodes from Graphics Processing Pipeline 103 to deliver data to a display device, network, electronic control system, other Computing System 100, other Graphics Subsystem 110, or the like.

Figure 1B:
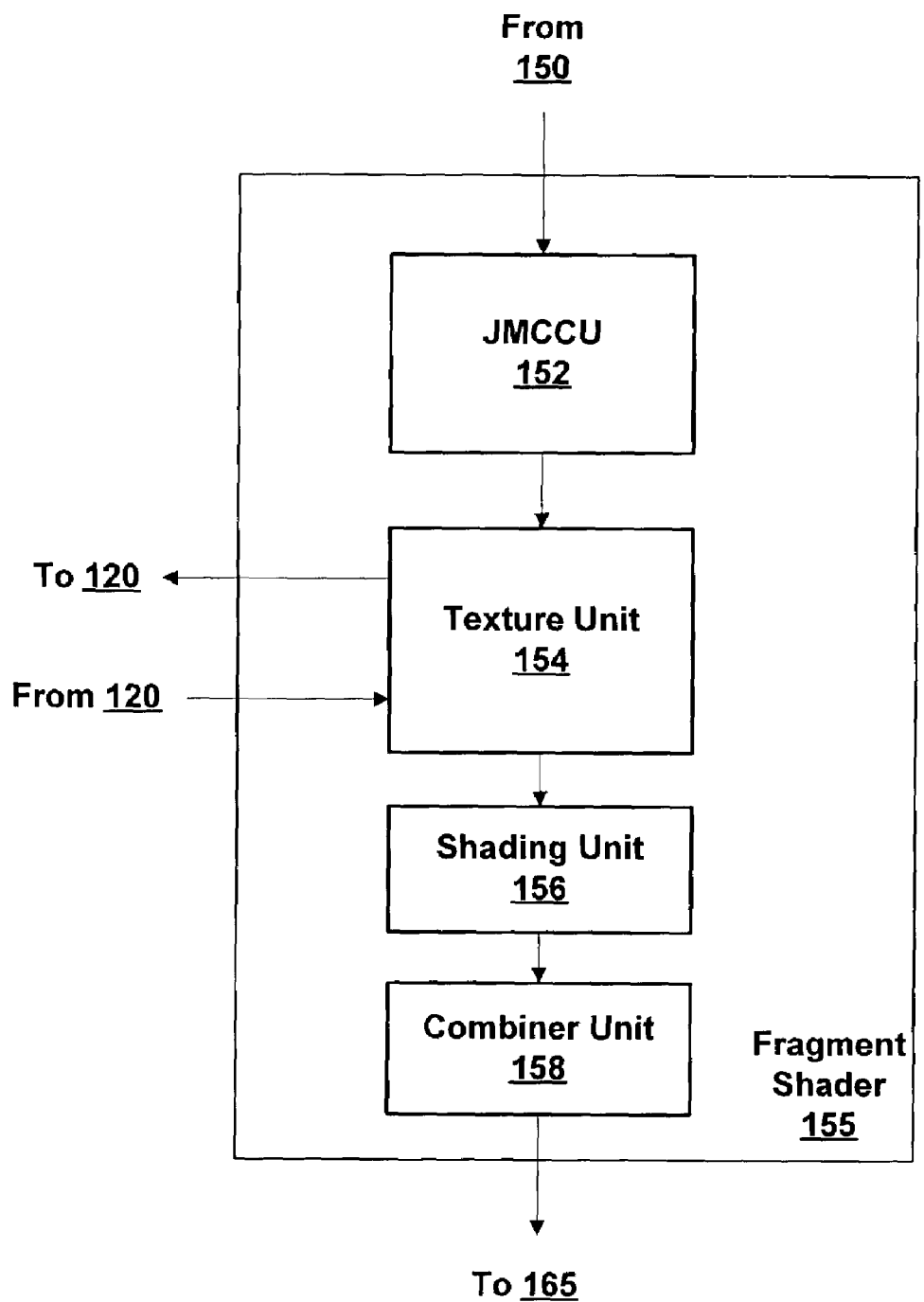
FIG. 1B is a block diagram of an exemplary embodiment of the Fragment Shader of FIG. 1A in accordance with one or more aspects of the present invention.

FIG. 1B is a block diagram of an exemplary embodiment of Fragment Shader 155 in accordance with one or more aspects of the present invention. JMCCU (Jitter Map Coordinate Computation Unit) 152 receives fragment data and shader program instructions from Rasterizer 150 and optionally computes and outputs jitter map coordinates. JMCCU 152 outputs fragment data, including any computed jitter map coordinates, and the shader program instructions to Texture Unit 154. Texture Unit 154 reads additional shader program instructions and map data (height field, bump, texture, jitter map, and the like) from Local Memory 140 or Host Memory 112, via Memory Controller 120. The map data stored in graphics memory may be generated by Programmable Graphics Processor 105, by Host Processor 114, by another device, by a human, or the like. Memory Controller 120 outputs the map data and the additional shader program instructions to Texture Unit 154. Texture Unit 154 processes the map data, as described further herein, and outputs processed map data, fragment data, and the additional program instructions.

A Shading Unit 156 receives the processed map data, fragment data, and the additional shader program instructions from Texture Unit 154. Shading Unit 156 processes the processed map data and fragment data as specified by the additional shader program instructions and outputs shaded fragment data, e.g., x, y, color, depth, and other parameters. Shading Unit 156 generates codewords from the additional shader program instructions that are output to a Combiner Unit 158. Combiner Unit 158 processes the shaded fragment data the codewords and outputs combined fragment data, e.g., x, y, color, depth, configuration control, other parameters, to Raster Analyzer 165.

Figure 2A:
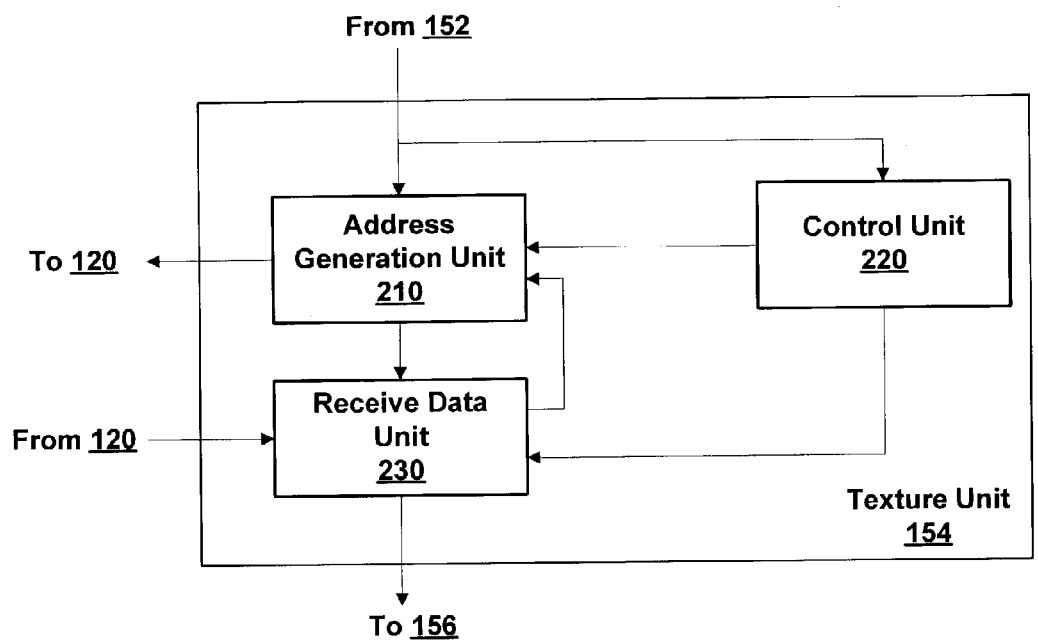
FIG. 2A is a block diagram of an exemplary embodiment of the Texture Unit of FIG. 1B in accordance with one or more aspects of the present invention.

FIG. 2A is a block diagram of an exemplary embodiment of Texture Unit 154 of FIG. 1 B in accordance with one or more aspects of the present invention. Texture Unit 154 receives fragment data, including any computed jitter map coordinates, and the shader program instructions from JMCCU 152. The shader program instructions are input to a Control Unit 220 that generates codewords output to an Address Generation Unit 210 and a Receive Data Unit 230. Address Generation Unit 210 receives the fragment data and the codewords and optionally produces read addresses for reading additional shader program instructions, texture data, jitter map data, height field data, and the like. The read addresses are output with read requests to Memory Controller 120. A portion of the fragment data, such as color data, map coordinates, and depth data, is passed through Address Generation Unit 210 to Receive Data Unit 230.

Receive Data Unit 230 receives codewords from Control Unit 220 and map data and the additional shader program instructions from Memory Controller 120. Receive Data Unit 230 optionally outputs the map data received from Memory Controller 120 to Address Generation Unit 210. Receive Data Unit 230 optionally outputs the additional shader program instructions, the map data, and a portion of the fragment data, e.g., color data and depth data, to Shading Unit 156. Address Generation Unit 210 optionally combines, as described further herein, the map data received from Receive Data Unit 230 with a subset of the portion of the fragment data, e.g., map coordinates, to produce additional read addresses that are output with read requests to Memory Controller 120. Receive Data Unit 230 receives additional map data from Memory Controller 120 (obtained using the additional map coordinates) and optionally outputs the additional map data to Shading Unit 156.

Figure 2B:
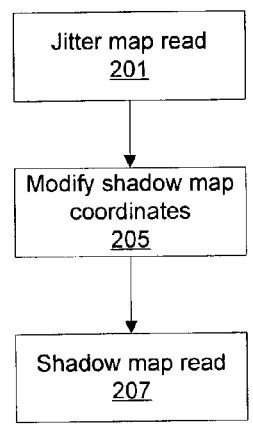
FIG. 2B is a flow diagram of an exemplary embodiment of a shadow mapping process in accordance with one or more aspects of the present invention.

FIG. 2B is a flow diagram of an exemplary embodiment of a shadow mapping process in accordance with one or more aspects of the present invention. A shader program includes instructions input to Control Unit 220 that generate codewords. In step 201 the codewords configure Address Generation Unit 210 to output a read address generated using jitter map coordinates and a read request to Memory Controller 120 to read jitter map data, e.g., shadow map coordinate displacements, as specified by the program instructions. Address Generation Unit 210 receives and outputs shadow map coordinates. In step 201 the shadow map coordinate displacements are output from Memory Controller 120 to Receive Data Unit 230. In step 205 the codewords configure Receive Data Unit 230 to output the shadow map coordinate displacements to Address Generation Unit 210. The codewords configure Address Generation Unit 210 to combine the shadow map coordinate displacements with the shadow map coordinates to produce modified shadow map coordinates, as specified by the program instructions.

In one embodiment of the shader program, the program instructions configure (via codewords) Address Generation Unit 210 to sum each shadow map coordinate with a corresponding shadow map coordinate displacement to produce each modified shadow map coordinate. In step 207 Address Generation Unit 210 outputs a read address generated using the modified shadow map coordinates and a read request to Memory Controller 120 to read shadow map data, e.g., shadow depth values from a shadow map, as specified by the program instructions. The shadow depth values are output from Memory Controller 120 and received by Receive Data Unit 230. The shader program instructions may specify repeating steps 201, 205, and 207 to read additional shadow map coordinate displacements for a fragment, modify additional shadow map coordinates using the additional shadow map coordinate displacements to produce additional modified shadow map coordinates, and read additional shadow map depths from the shadow map.

Figure 3A:
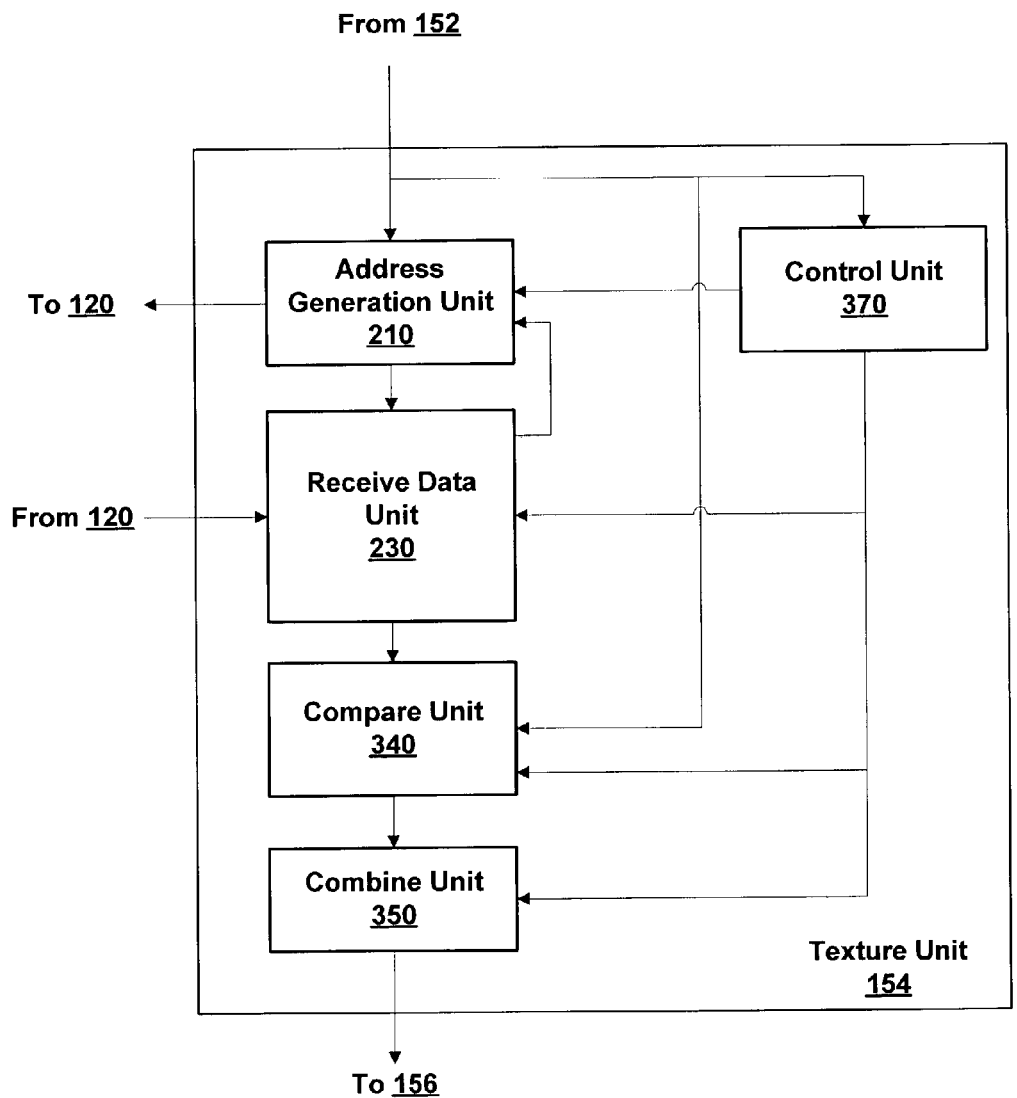
FIG. 3A is a block diagram of an alternate exemplary embodiment of the Texture Unit of FIG. 1B in accordance with one or more aspects of the present invention.

FIG. 3A is a block diagram of an alternate exemplary embodiment of the Texture Unit 154 in accordance with one or more aspects of the present invention. In this embodiment, in addition to Address Generation Unit 210 and Receive Data Unit 230, Texture Unit 154 includes a Compare Unit 340 and a Combine Unit 350. A Control Unit 370 receives shader program instructions from JMCCU 152 and generates codewords for Address Generation Unit 210, Receive Data Unit 230, Compare Unit 340, and Combine Unit 350. The codewords configure each unit to perform specific operations. Address Generation Unit 210 receives codewords from Control Unit 370 and produces read addresses for reading additional shader program instructions. Address Generation Unit 210 receives a portion of fragment data including map coordinates from JMCCU 152 and optionally produces read addresses for reading map data stored in graphics memory. The read addresses are output with read requests to Memory Controller 120. Another portion of the fragment data, such as color data, lighting parameters, and depth data, are passed from JMCCU 152 to Compare Unit 340. In another alternate embodiment, the other portion of the fragment data is passed to Compare Unit 340 through Address Generation Unit 210 and Receive Data Unit 230.

In this embodiment Receive Data Unit 230 is configured to output additional map data and additional shader program instructions to Compare Unit 340. Compare Unit 340 receives the other fragment data, including fragment light view depth values (fragment depth values), from JMCCU 152 and receives the codewords from Control Unit 370. Compare Unit 340 is configured to compare the additional map data, e.g. shadow depth values, to corresponding fragment depth values to produce shadow state values. The shadow state values, additional shader program instructions, and the other portion of the fragment data are output by Compare Unit 340 to Combine Unit 350. Combine Unit 350 is optionally configured to combine the shadow state values, as described further herein, to produce a combined shadow state value. Combine Unit 350 outputs the combined shadow state value, additional shader program instructions, and the other portion of the fragment data to Shading Unit 156.

Figure 3B:
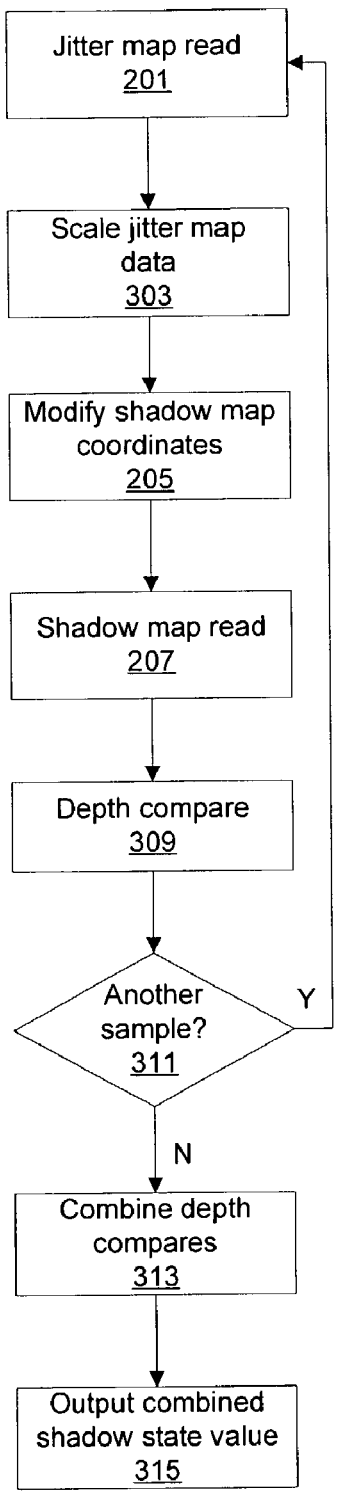
FIG. 3B is a flow diagram of an exemplary embodiment of a shadow mapping process in accordance with one or more aspects of the present invention.

FIG. 3B is a flow diagram of an exemplary embodiment of a shadow mapping process in accordance with one or more aspects of the present invention. Address Generation Unit 210 receives (shadow, jitter, texture, and the like) map coordinates. A shader program includes instructions input to Control Unit 220 that generate codewords. In step 201 the codewords configure Address Generation Unit 210 to output a read address generated using jitter map coordinates and a read request to Memory Controller 120 to read jitter map data, e.g., shadow map coordinate displacements, as specified by the program instructions. Address Generation Unit 210 receives and outputs shadow map coordinates. In step 201 the shadow map coordinate displacements, e.g., jitter map data, are output from Memory Controller 120 to Receive Data Unit 230. In step 303 Receive Data Unit 230 scales the jitter map data to generate scaled jitter map data, e.g., scaled shadow map displacements, as specified by the program instructions. In one embodiment of the shader program, the program instructions configure (via codewords) Receive Data Unit 230 to scale the jitter map data to generate scaled jitter map data that are less than positive two and greater than negative two. In step 205 the codewords configure Receive Data Unit 230 to output the scaled jitter map data to Address Generation Unit 210. The codewords configure Address Generation Unit 210 to combine the scaled jitter map data with shadow map coordinates received from JMCCU 152 to produce modified shadow map coordinates, as specified by the program instructions.

In step 207 Address Generation Unit 210 outputs a read address generated using the modified shadow map coordinates and a read request to Memory Controller 120 to read a shadow depth value from a shadow map, as specified by the program instructions. The shadow depth value is output from Memory Controller 120 and received by Receive Data Unit 230. In step 309 Receive Data Unit 230 outputs the shadow depth value to Compare Unit 340. Compare Unit 340 receives fragment data, including a fragment depth value, from JMCCU 152. The shadow depth value and the fragment depth value each correspond to one x,y location. Compare Unit 340 compares the fragment depth value to the shadow depth value and produces a shadow state value corresponding to the x,y location, as specified by the program instructions.

In step 311 Control Unit 370 determines if shader program instructions specify that another shadow depth value, e.g., sample, will be read from graphics memory, and if so, steps 201, 303, 205, 207, and 309 are repeated. An additional fragment depth value and an additional shadow depth value are received by Receive Data Unit 230 and an additional shadow state value is produced by Compare Unit 340, as specified by the program instructions. Each additional shadow depth value is read using the shadow map coordinates combined with additional jitter map coordinates. Furthermore, steps 201, 303, 205, 207, and 309 may be repeated to produce further additional shadow state values as specified by the shader program.

If in step 311 Control Unit 370 determines that another sample will not be read from graphics memory, in step 313 the shadow state value and one or more additional shadow state values are output by Compare Unit 340 to Combine Unit 350. The program instructions configure (via codewords) Combine Unit 350 to combine the shadow state value and the one or more additional shadow state values to produce a combined shadow state value. For example, in one embodiment of the shader program, the program instructions specify that the combined shadow state value is a weighted average of the shadow state value and the one or more additional shadow state values.

In step 315 Combine Unit 350 outputs the combined shadow state value to Shading Unit 156. Shading Unit 156 optionally uses the combined shadow state value when processing the fragment data to produce shaded fragment data. For example, a shader program may select between two colors depending on the combined shadow state value. Another shader program may modify a fragment color to "darken" the color dependent on the combined shadow state value. In an alternate embodiment, Combine Unit 350 is omitted and the additional shadow state values are not produced. In the alternate embodiment, the shadow state value is output by Compare Unit 340 to Shading Unit 156. In the alternate embodiment, Shading Unit 156 optionally uses the shadow state value when processing the fragment data to produce shaded fragment data.

Figure 4A:
FIG. 4A is an image of an aliased shadow edge.

FIG. 4A is an image of an aliased shadow edge. One sample, e.g., shadow depth value is read from a shadow map using a pair of shadow map coordinates, e.g., (s,t), for each output pixel. Each sample is compared with a corresponding fragment depth and a shadow state value is produced for each output pixel. The shadow state is output as a combined shadow state value for each output pixel. Finally, the combined shadow state value for each output pixel is used by a shader program to determine a final color for each output pixel. When a shadow is close to a viewer, each shadow depth value stored in the shadow map will be used to generate shadow state values for several neighboring output pixels. Storing the shadow map at a higher resolution may reduce the aliasing, but will require more memory to store the higher resolution shadow map.

Figure 4B:
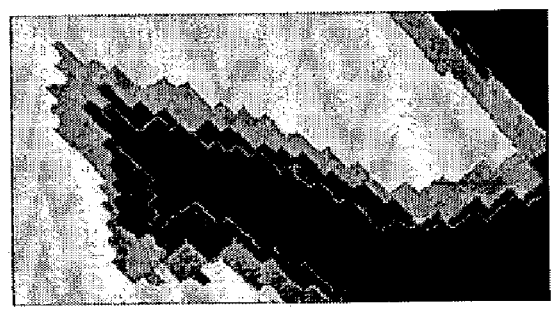
FIGS. 4B and 4C are images of antialiased shadow edges produced in accordance with one or more aspects of the present invention.

FIG. 4B is an image of an antialiased shadow edge produced in accordance with one or more aspects of the present invention. Three samples, e.g., shadow depth values are read from a shadow map using three pairs of shadow map coordinates, e.g., (s,t), for each output pixel. The three pairs of shadow map coordinates used to generate a shadow state value for a fragment are at the same sub-texel positions within each shadow map texel (texture element). In other words, a jitter map is used to generate shadow map coordinates that only contains three pairs of shadow map coordinate displacements. Each sample is compared with a corresponding fragment depth in light view and three shadow state values are produced for each output pixel. The three shadow state values are combined to produce a combined shadow state value for each output pixel. Finally, the combined shadow state value for each output pixel is used by a shader program to determine a final color for each output pixel. When three samples are used, four different values are possible for the combined shadow state value: no samples "in shadow", one sample "in shadow", two samples "in shadow", or all three samples "in shadow". The four different values may be used during fragment shading resulting in four different possible shades for a fragment.

Figure 4C:
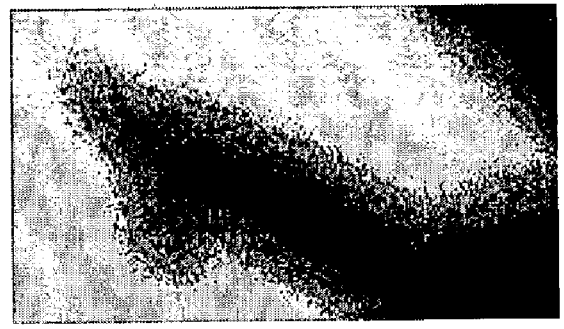

FIG. 4C is another image of an antialiased shadow edge produced in accordance with one or more aspects of the present invention. Three samples are read from a shadow map using three pairs of shadow map coordinates for each output pixel. Each pair of shadow map coordinates used to generate the image are jittered using shadow map coordinate displacements read from a jitter map and optionally modified as described further herein. Therefore, the three pairs of shadow map coordinates used to generate a shadow state value for a fragment may be at different sub-texel positions within each shadow map texel. Displacing the shadow map coordinates produces a more natural looking, antialiased shadow without using more memory to store a higher resolution shadow map when the shadow is close to the viewer.

A shader program may include program instructions to determine a magnification of the shadow map based on derivatives of shadow map coordinates s and t, such as ds/dx and dt/dy. The shader program may select a number of samples using the magnification, for example selecting more samples as the magnification increases.

Figure 5A:
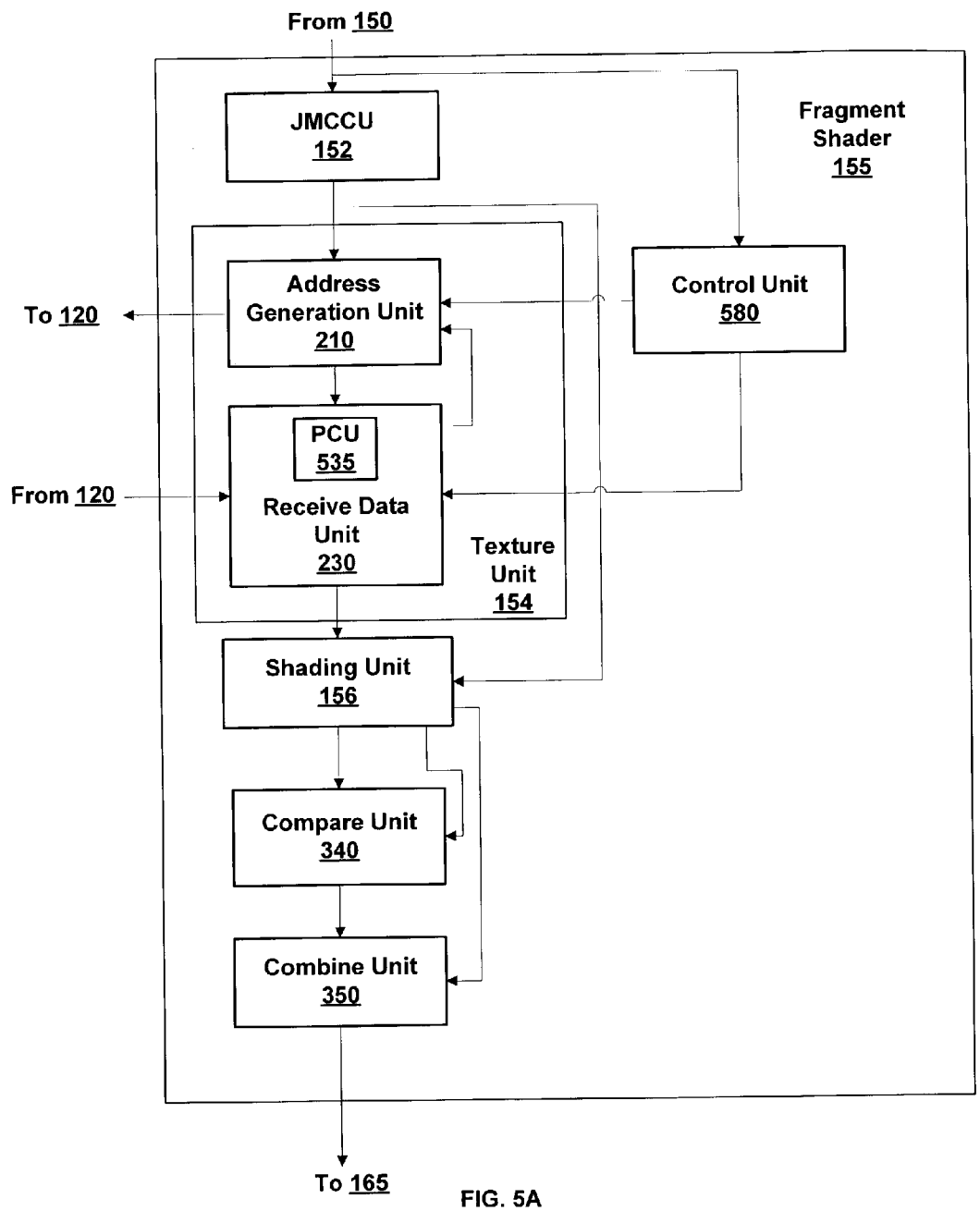
FIG. 5A is a block diagram of an exemplary embodiment of the Fragment Shader of FIG. 1A in accordance with one or more aspects of the present invention.

FIG. 5A is a block diagram of an exemplary embodiment of Fragment Shader 155 in accordance with one or more aspects of the present invention. In this embodiment Fragment Shader 155 includes JMCCU 152, Texture Unit 154, Shading Unit 156, Compare Unit 390, Combine Unit 395. A Control Unit 380 receives shader program instructions from JMCCU 152 and generates codewords for Address Generation Unit 210 and Receive Data Unit 230. The codewords configure each unit to perform specific operations.

In this embodiment Receive Data Unit 230 in Texture Unit 154 includes a PCU (Programmable Computation Unit) 335 that may be configured by the codewords to process the map data received from Memory Controller 120 using matrix operations, such as rotations to produce rotated map data. Alternatively, PCU 335 may be configured to process the map data received from Memory Controller 120 using linear operations, such as mirroring. Receive Data Unit 230 is configured to output the rotated map data or the map data to Address Generation Unit 210. Address Generation Unit 210 combines the rotated map data or the map data with the portion of the fragment data, e.g., map coordinates, to produce additional read addresses that are output with read requests to Memory Controller 120. Receive Data Unit 230 receives additional map data from Memory Controller 120 (obtained using the additional map coordinates) and optionally outputs the additional map data to Shading Unit 156. Receive Data Unit 230 receives additional shader program instructions from Memory Controller 120 and optionally outputs the additional shader program instructions to Shading Unit 156. Shading Unit 156 receives fragment data, e.g., color data, lighting parameters, depth data, and the like, from JMCCU 152. Shading Unit 156 receives the additional shader program instructions from Receive Data Unit 230 and generates additional codewords. Shading Unit 156 outputs the additional codewords to Compare Unit 340 and Combine Unit 350 to configure those units to perform specific operations.

Shading Unit 156 processes the fragment data to produce processed fragment data, including fragment light view depth values (fragment depth values). The fragment depth values and additional shadow map data, e.g., shadow depth values, are output by Shading Unit 156 to Compare Unit 340. Compare Unit 340 is configured to compare the additional shadow map data, e.g. shadow depth values, to corresponding fragment depth values to produce shadow state values. The shadow state values are output by Compare Unit 340 to Combine Unit 350. Combine Unit 350 is optionally configured to combine the shadow state values, as described further herein, to produce a combined shadow state value. Combine Unit 350 outputs the combined shadow state value to Raster Analyzer 165. Combine Unit 350 receives the processed fragment data and the codewords from Shading Unit 156 and outputs the processed fragment data to Raster Analyzer 165.

Figure 5B:
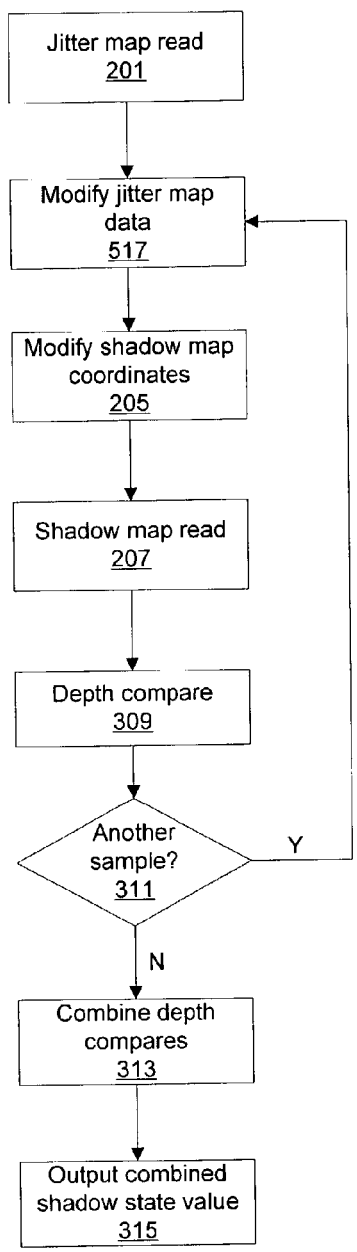
FIG. 5B is a flow diagram of an exemplary embodiment of shadow mapping processes in accordance with one or more aspects of the present invention.

FIG. 5B is a flow diagram of an exemplary embodiment of shadow mapping processes in accordance with one or more aspects of the present invention. Address Generation Unit 210 receives (shadow, jitter, texture, and the like) map coordinates. In step 201 Address Generation Unit 210 outputs a read address generated using jitter map coordinates and a read request to Memory Controller 120 to read jitter map data, e.g., shadow map coordinate displacements. In step 201 the shadow map coordinate displacements, e.g., jitter map data, are output from Memory Controller 120 to Receive Data Unit 230. In step 517 Receive Data Unit 230 modifies the jitter map data to generate scaled jitter map data, e.g., scaled shadow map coordinate displacements. In one embodiment the jitter map data are scaled to generate scaled jitter map data that are less than positive two and greater than negative two. In step 205 Receive Data Unit 230 outputs the scaled jitter map data to Address Generation Unit 210. Receive Data Unit 230 optionally saves either the scaled jitter map data or the jitter map data locally. Address Generation Unit 210 combines the scaled jitter map data with shadow map coordinates received from JMCCU 152 to produce modified shadow map coordinates.

In step 207 Address Generation Unit 210 outputs a read address generated using the modified shadow map coordinates and a read request to Memory Controller 120 to read shadow map data, e.g., a shadow depth value. The shadow depth value is output from Memory Controller 120 and received by Receive Data Unit 230. In step 309 Receive Data Unit 230 outputs the shadow depth value to Shading Unit 156. Shading Unit 156 receives fragment data from JMCCU 152 and generates fragment depth values. Shading Unit 156 outputs the fragment depth values and shadow depth values to Compare Unit 340. The shadow depth value and the fragment depth value each correspond to one x,y location. Compare Unit 340 compares the fragment depth value to the shadow depth value and produces a shadow state value corresponding to the x,y location.

Figure 5C:
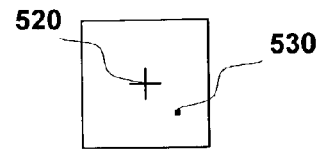
FIGS. 5C, 5D, 5E and 5F are diagrams of jitter map data and modified jitter map data in accordance with one or more aspects of the present invention.
Figure 5D:
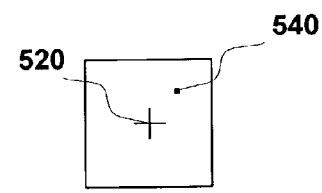
Figure 5E:
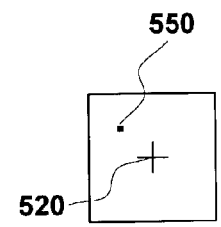
Figure 5F:
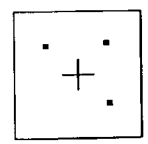

In step 311 Control Unit 580 determines if shader program instructions specify that another shadow depth value, e.g., sample, will be read from graphics memory, and, if so, in step 517 Receive Data Unit 230 modifies either the jitter map data or the scaled jitter map data to produce additional scaled jitter map data. For example, Receive Data Unit 230 may produce the additional scaled jitter map data by rotating the scaled jitter map data. FIGS. 5C, 5D, 5E and 5F are diagrams of jitter map data and rotated jitter map data. FIG. 5C includes scaled jitter map data Position 530 defined by two coordinate offsets, e.g., an s map coordinate displacement and a t map coordinate displacement. In step 517, Receive Data Unit 230 rotates Position 530 ninety degrees around a Center Point 520 to produce Position 540. Alternatively, Receive Data Unit 230 may produce the additional scaled jitter map data by scaling and rotating the jitter map data using a 2×2 matrix multiply operation, e.g., matrix transformation. The three pairs of shadow map coordinates used to generate each output pixel in FIG. 4C are produced by scaling and rotating the shadow map coordinate displacements read from the jitter map. In one embodiment of Fragment Shader 155, one jitter map read and three shadow map reads may be completed in a single pass within Fragment Shader 155 to produce the image shown in FIG. 4C.

In step 517 Receive Data Unit 230 optionally saves the additional scaled jitter map data locally. Steps 205, 207, 309, 311 are repeated using the additional scaled jitter map data produced in step 517 to produce an additional shadow state value. In step 311 Control Unit 580 again determines if the shader program instructions specify that another sample will be read from graphics memory, and, if so, in step 517 Receive Data Unit 230 modifies either the additional scaled jitter map data or the jitter map data to produce further additional scaled jitter map data. For example, Receive Data Unit 230 rotates Position 540 ninety degrees around Center Point 520 to produce Position 550. The three samples (Positions 530, 540, and 550) are shown together in FIG. 5F. Steps 205, 207, 309, 311 are repeated using the further additional scaled jitter map data produced in step 517 to produce another additional shadow state value.

If in step 311 Control Unit 580 determines that another sample will not be read from graphics memory, in step 313 the shadow state value and one or more additional shadow state values are output by Compare Unit 340 to Combine Unit 350. Combine Unit 350 combines the shadow state value and the one or more additional shadow state values to produce a combined shadow state value. For example, the combined shadow state value may be a weighted average of the shadow state value and the one or more additional shadow state values. When three samples are used, four different values are possible for the combined shadow state value. Likewise, when two samples are used, three different values are possible for the combined shadow state value.

In step 315 Combine Unit 350 outputs the combined shadow state value to Raster Analyzer 165. Raster Analyzer 165 optionally uses the combined shadow state value when processing the processed fragment data to produce modified fragment data. For example, Raster Analyzer 165 may modify a fragment color to "darken" the color dependent on the combined shadow state value. In an alternate embodiment, Combine Unit 350 is omitted and the additional shadow state values are not produced. In the alternate embodiment, the shadow state value is output by Compare Unit 340 to Raster Analyzer 165. Compare Unit 340 receives the processed fragment data and the codewords from Shading Unit 156 and outputs the processed fragment data to Raster Analyzer 165. In the alternate embodiment, Raster Analyzer 165 optionally uses the shadow state value when processing the processed fragment data to produce shaded fragment data.

Figure 6A:
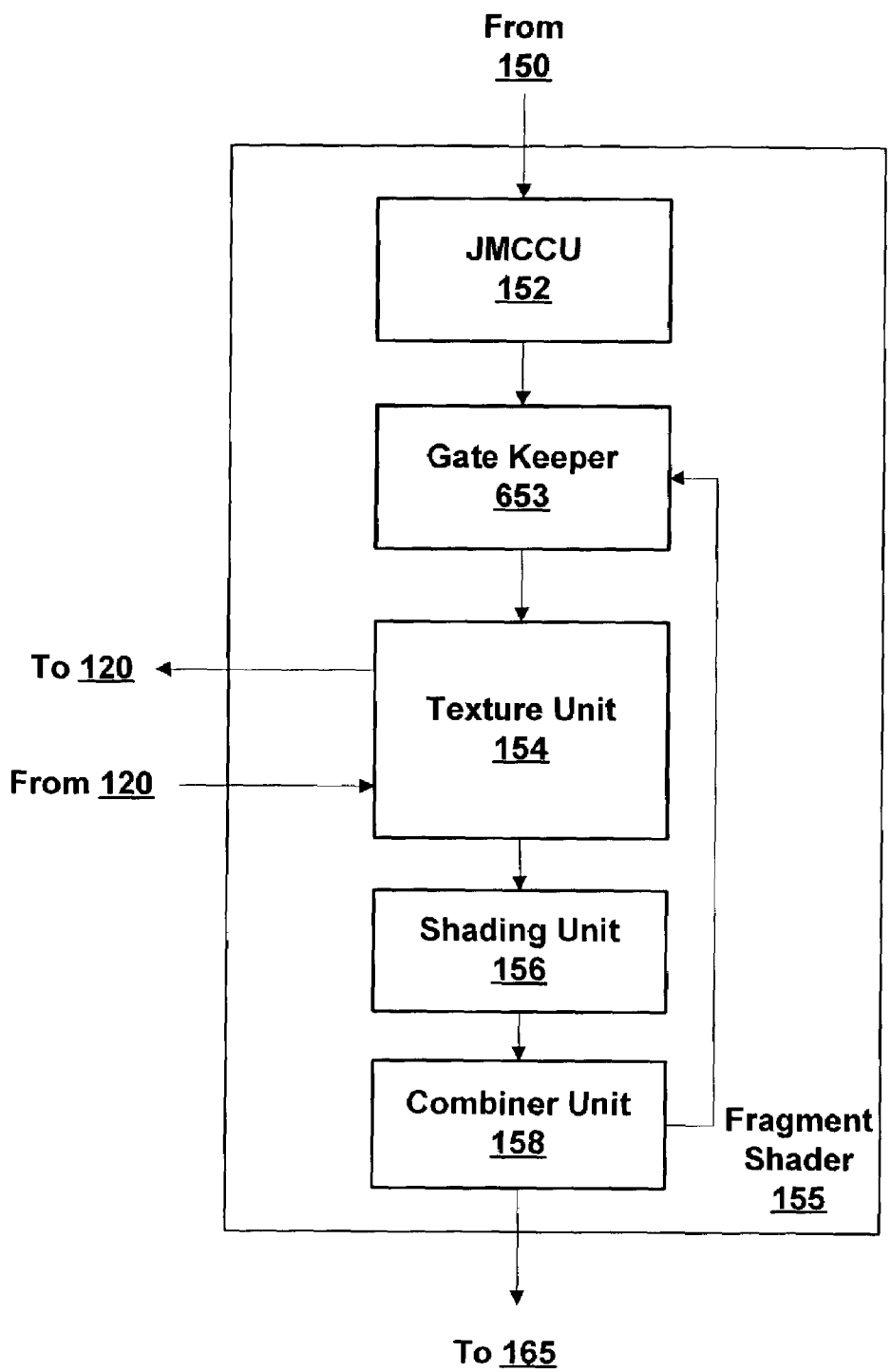
FIG. 6A is a block diagram of an alternate exemplary embodiment of the Fragment Shader of FIG. 1A in accordance with one or more aspects of the present invention.

FIG. 6A is a block diagram of an alternate exemplary embodiment of Fragment Shader 155 in accordance with one or more aspects of the present invention. In addition to JMCCU 152, Texture Unit 154, Shading Unit 156, and Combiner Unit 158, this embodiment includes a Gate Keeper 653. As in the embodiment in FIG. 1B, JMCCU 152 receives fragment data and shader program instructions from Rasterizer 150 and optionally computes and outputs jitter map coordinates. JMCCU 152 outputs fragment data, including any computed jitter map coordinates, and the shader program instructions to Gate Keeper 653. Gate Keeper 653 also receives codewords and combined fragment data from Combiner Unit 158 to be processed in another pass within Fragment Shader 155. Gate Keeper 653 outputs the codewords and combined fragment data from Combiner Unit 158 to Texture Unit 154. When codewords and combined fragment data are not received from Combiner Unit 158, Gate Keeper 653 outputs the fragment data and the shader program instructions received from JMCCU 152 to Texture Unit 154. Texture Unit 154 reads additional shader program instructions and map data (height field, bump, texture, jitter map, and the like) from Local Memory 140 or Host Memory 112, via Memory Controller 120. Texture Unit 154 processes the map data and outputs processed map data, fragment data, and the additional program instructions.

Shading Unit 156 receives the processed map data, fragment data, and the additional shader program instructions from Texture Unit 154. Shading Unit 156 processes the processed map data and fragment data as specified by the additional shader program instructions and outputs shaded fragment data and codewords to Combiner Unit 158. Combiner Unit 158 processes the shaded fragment data and the codewords and outputs combined fragment data to Raster Analyzer 165 or the combined fragment data and codewords Gate Keeper 653 as specified by the codewords received from Shading Unit 156. Shaded fragment data may be output from Combiner Unit 158 to Gate Keeper 653 for further processing in Fragment Shader 155, such as filtering several fragments to generate a pixel, e.g., supersampling.

Figure 6B:
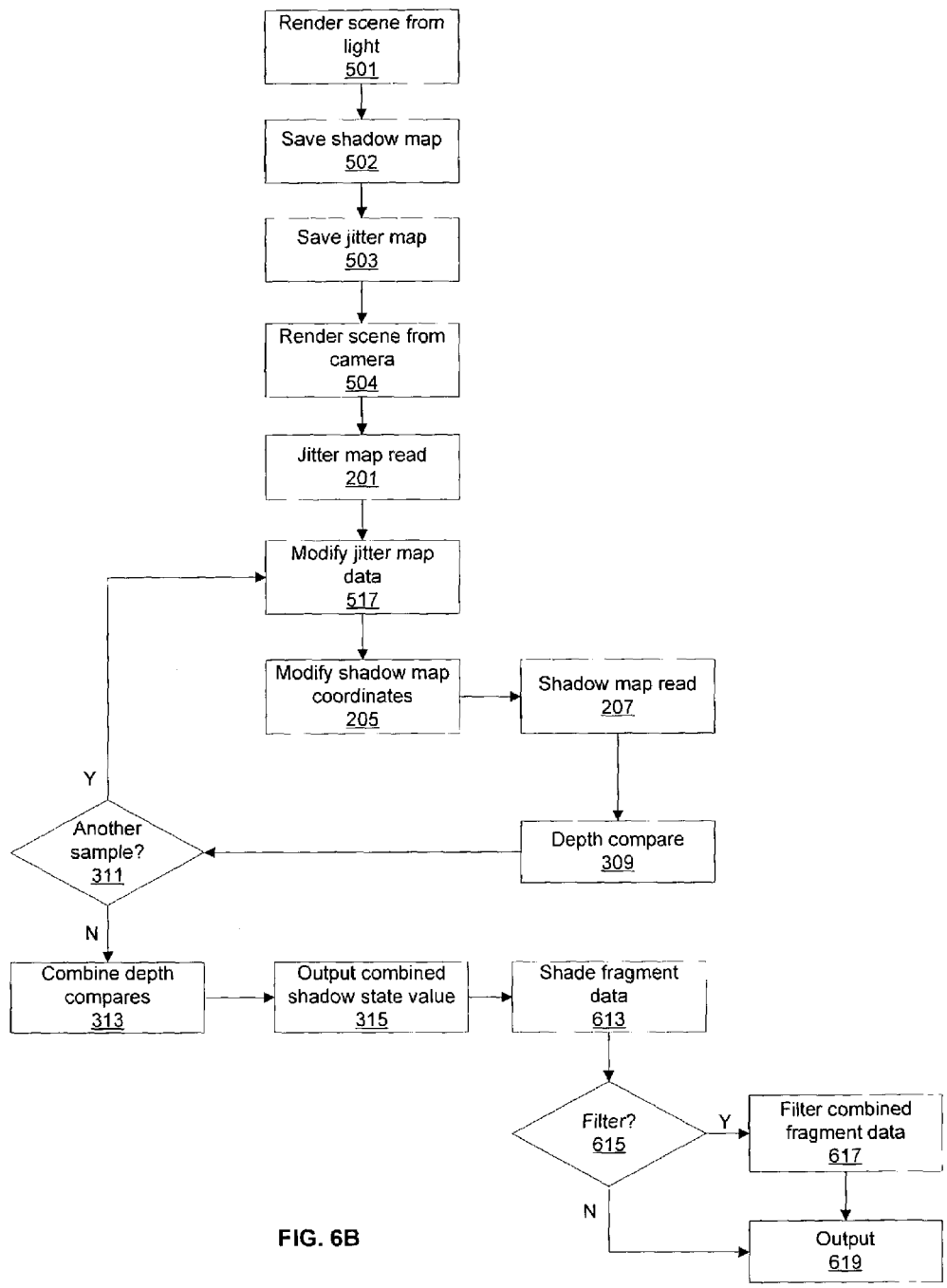
FIG. 6B is a flow diagram of an exemplary embodiment of shadow mapping processes in accordance with one or more aspects of the present invention.

FIG. 6B is a flow diagram of an exemplary embodiment of shadow mapping processes in accordance with one or more aspects of the present invention. In step 501 a scene is rendered from the viewpoint of a light to produce a shadow map. The shadow map includes shadow depth values of the shadow volume surface nearest to the light. In step 502 the shadow map is stored in graphics memory. In step 503 a jitter map is stored in graphics memory. The jitter map may be user-defined or selected from a collection of predefined jitter maps. The jitter map may be a group of samples in pseudo-random positions. In step 504 the scene is rendered from the viewpoint of a camera.

Address Generation Unit 210 receives (shadow, jitter, texture, and the like) map coordinates. In step 201 Address Generation Unit 210 outputs a read address generated using jitter map coordinates and a read request to Memory Controller 120 to read jitter map data, e.g., shadow map coordinate displacements. In step 201 the shadow map coordinate displacements, e.g., jitter map data, are output from Memory Controller 120 to Receive Data Unit 230. In step 517 Receive Data Unit 230 modifies the jitter map data to generate scaled jitter map data, e.g., scaled shadow map coordinate displacements. In step 205 Receive Data Unit 230 outputs the scaled jitter map data to Address Generation Unit 210. Address Generation Unit 210 combines the scaled jitter map data with shadow map coordinates received from JMCCU 152 via Gate Keeper 653 to produce modified shadow map coordinates.

In step 207 Address Generation Unit 210 outputs a read address generated using the modified shadow map coordinates and a read request to Memory Controller 120 to read shadow map data, e.g., a shadow depth value. The shadow depth value is output from Memory Controller 120 and received by Receive Data Unit 230. In step 309 Receive Data Unit 230 outputs the shadow depth value to Compare Unit 340. Compare Unit 340 receives fragment data, including a fragment depth value, from JMCCU 152. Compare Unit 340 compares the fragment depth value to the shadow depth value and produces a shadow state value corresponding to an x,y location.

In step 311 Control Unit 670 determines if shader program instructions specify that another shadow depth value, e.g., sample, will be read from graphics memory, and, if so, in step 517 Receive Data Unit 230 modifies either the jitter map data or the scaled jitter map data to produce additional scaled jitter map data. Each additional shadow depth value is read using the shadow map coordinates combined with additional jitter map coordinates. Furthermore, steps 205, 207, and 309 may be repeated to produce further additional shadow state values.

If in step 311 Control Unit 670 determines that another sample will not be read from graphics memory, in step 313 the shadow state value and one or more additional shadow state values are output by Compare Unit 340 to Combine Unit 350. Combine Unit 350 combines the shadow state value and the one or more additional shadow state values to produce a combined shadow state value. When three samples are used to produce the combined shadow state value the combined shadow state value has four possible values. In step 315 Combine Unit 350 outputs the combined shadow state value to Shading Unit 156. In step 613 Shading Unit 156 optionally uses the combined shadow state value when processing the fragment data to produce shaded fragment data. Shading Unit 156 outputs the shaded fragment data and codewords to Combiner Unit 158. Combiner Unit 158 processes the shaded fragment data and the codewords and produces combined fragment data.

In step 615 Combiner Unit 158 determines if codewords specify that fragment data corresponding to more than one x,y location will be filtered, for example when supersampling or accumulation buffer techniques are used for antialiasing an image. If, in step 615, Combiner Unit 158 determines filtering is specified, in step 617 combined fragment data to two or more x,y locations are filtered to produce filtered pixel data. For example, when a 2×2 supersample is used, four x,y locations are filtered to produce a filtered pixel color value. When three samples are used to produce the combined shadow state value for each fragment and 2×2 supersample is used, a "filtered" shadow state value has thirteen possible values.

In step 619 the filtered pixel data is output by Shading Unit 156 to Combiner Unit 158. If, in step 615, Combiner Unit 158 determines filtering is not specified, in step 619 the combined fragment data is output to Raster Analyzer 165 by Combiner Unit 158.

Figure 7A:
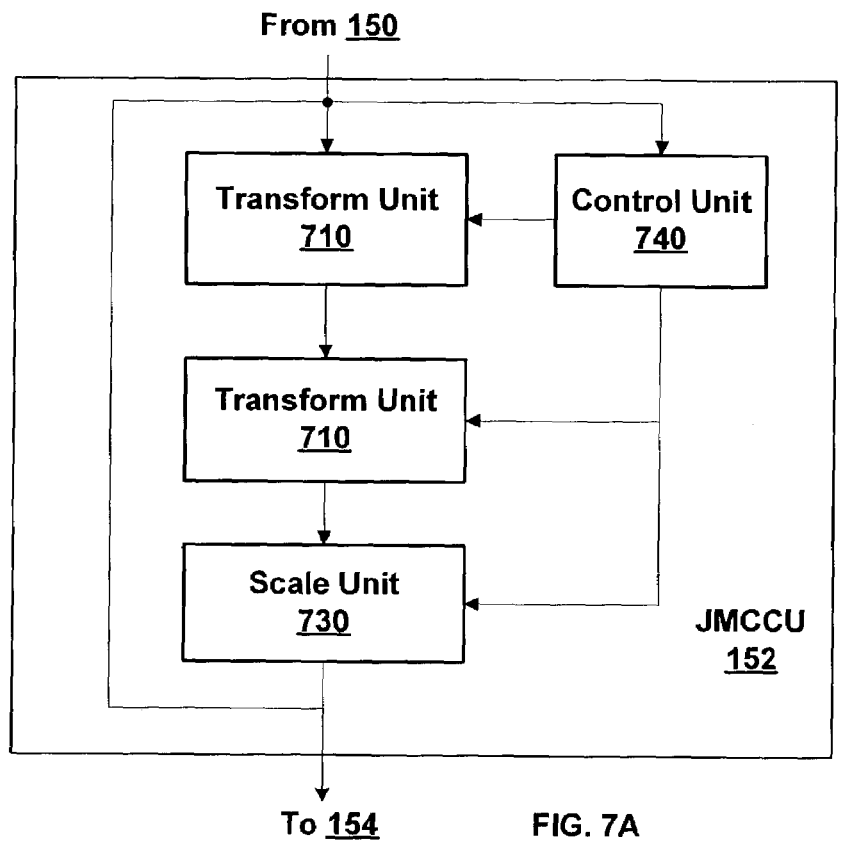
FIGS. 7A and 7B are block diagrams of exemplary embodiments of the JMCCU (Jitter Map Coordinate Computation Unit) of FIG. 1B in accordance with one or more aspects of the present invention.
Figure 7B:
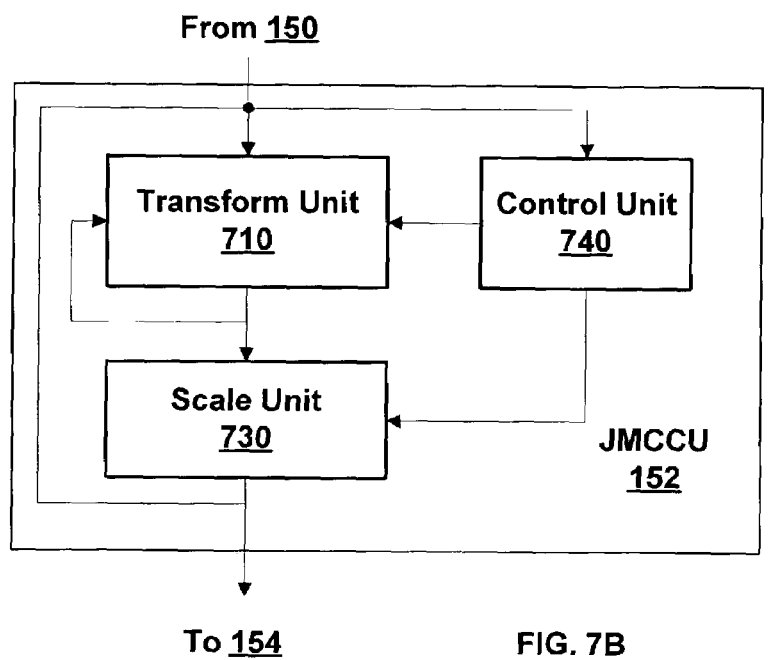

FIG. 7A is a block diagram of an exemplary embodiment of JMCCU 152 in accordance with one or more aspects of the present invention. JMCCU 152 receives fragment data, including map coordinates represented in a space, and shader program instructions from Rasterizer 150 and optionally computes and outputs map coordinates represented in another space. JMCCU 152 also outputs the shader program instructions and the fragment data.

Control Unit 740 receives the shader program instructions and outputs codewords to Transform Units 710 and a Scale Unit 730. Transform Unit 710 is configured by the codewords to perform matrix transform operations, such as transforming a map coordinate represented in world or object space to a map coordinate represented in eye (camera) space, light source view coordinate space (light view), normalized device coordinate space, or the like. First Transform Unit 710 receives map coordinates represented in the space, e.g., world, object, or the like, and produces transformed map coordinates. Second Transform Unit 710 receives the transformed map coordinates and produces further transformed map coordinates. Scale Unit 730 receives the further transformed map coordinates and scales the further transformed map coordinates to produce map coordinates represented in the other space.

FIG. 7A is a block diagram of an alternate exemplary embodiment of JMCCU 152 in accordance with one or more aspects of the present invention. In this embodiment JMCCU 152 includes one Transform Unit 710 instead of including two Transform Units 710. Transform Unit 710 is configured by the codewords received from Control Unit 740 to process the transformed map coordinates and produce the further transformed map coordinates. In this embodiment data output by Transform Unit 710 may be input to Transform Unit 710 and processed in multiple passes.

Figure 8:
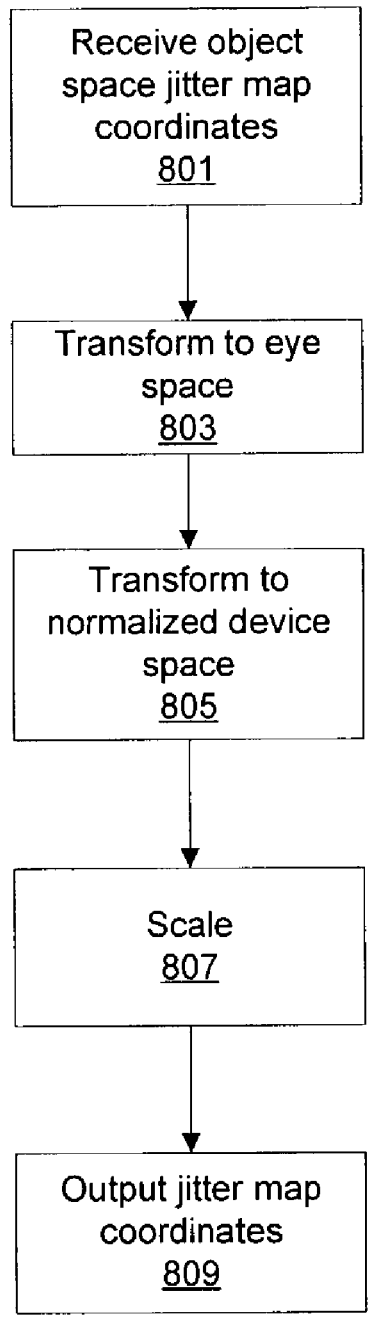
FIG. 8 is a flow diagram of an exemplary embodiment of producing jitter map coordinates in accordance with one or more aspects of the present invention.

FIG. 8 is a flow diagram of an exemplary embodiment of producing jitter map coordinates in accordance with one or more aspects of the present invention. In step 801 JMCCU 152 receives jitter map coordinates represented in object space. In step 803 Transform Unit 710 transforms the jitter map coordinates represented in object space to jitter map coordinates represented in eye space. In step 805 Transform Unit 710 transforms the jitter map coordinates represented in eye space to jitter map coordinates represented in normalized device space and outputs the jitter map coordinates represented in normalized device space to Scale Unit 730. In step 807 Scale Unit 730 scales the jitter map coordinates represented in normalized device space by a viewport dimension and a jitter map dimension to produce jitter map coordinates for accessing shadow map displacements. For example, an s jitter map coordinate may be scaled by a viewport width divided by the jitter map width. Likewise, a t jitter map coordinate may be scaled by a viewport height divided by the jitter map height. In step 809 Scale Unit 730 outputs the jitter map coordinates for accessing the shadow map displacements stored in the jitter map.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.

The invention claimed is:

1. A method for antialiasing a shadow, comprising:
obtaining shadow map coordinate displacements using jitter map coordinates;
combining the shadow map coordinate displacements and shadow map coordinates to produce modified shadow map coordinates;
obtaining a shadow depth value using the modified shadow map coordinates;
receiving a fragment depth value; and
comparing the obtained shadow depth value to the fragment depth value to produce a shadow state value.

2. The method of claim 1, further comprising generating the jitter map coordinates.

3. The method of claim 1, further comprising scaling the shadow map coordinate displacements prior to the combining.

4. The method of claim 1, further comprising shading a fragment associated with the fragment depth value at least partially responsive to the shadow state value.

5. The method of claim 1, further comprising:
receiving additional fragment light view depth values;
obtaining additional shadow depth values using additional modified shadow map coordinates;
comparing the additional shadow depth values obtained to the additional fragment light view depth values to produce additional shadow state values; and
combining the shadow state value and the additional shadow state values to produce a combined shadow state value.

6. The method of claim 5, further comprising shading a fragment associated with the fragment depth value at least partially responsive to the combined shadow state value to produce a shaded fragment.

7. The method of claim 6, further comprising combining a plurality of shaded fragments to produce filtered shaded fragments.

8. The method of claim 5 wherein the combined shadow state value is a weighted average of the shadow state value and the additional shadow state values.

9. The method of claim 1, further comprising generating additional shadow map coordinate displacements using the shadow map coordinate displacements obtained.

10. The method of claim 9, wherein the generating includes rotating the shadow map coordinate displacements.

11. The method of claim 1, wherein the shadow map coordinate displacements obtained are a portion of a collection of shadow map coordinate displacements.

12. The method of claim 11, wherein the collection of shadow map coordinate displacements comprises pseudo-random shadow map coordinate displacements.

13. The method of claim 11, wherein the collection of shadow map coordinate displacements comprises user-determined shadow map coordinate displacements.

14. A method for producing jitter map coordinates for accessing shadow map coordinate displacements, comprising:
receiving object space jitter map coordinates;
transforming the object space jitter map coordinates to produce eye space jitter map coordinates;
transforming the eye space jitter map coordinates to produce normalized device space jitter map coordinates; and
scaling the normalized device space jitter map coordinates to produce the jitter map coordinates for accessing the shadow map coordinate displacements, each jitter map coordinate being scaled by a viewport dimension and a jitter map dimension.

15. A shader program for antialiasing shadows, comprising:
program instructions to read a number of shadow map coordinate displacements for a fragment;
program instructions to modify shadow map coordinates for a fragment using the shadow map coordinate displacements and produce modified shadow map coordinates;
program instructions to read shadow map depths from a shadow map using the modified shadow map coordinates; and
program instructions to produce a combined shadow state value using the shadow map depths read from the shadow map and at least one fragment depth value.

16. The shader program of claim 15, further comprising program instructions to determine the number of shadow map displacements based on a magnification of the shadow map.

17. The shader program of claim 15, further comprising program instructions to shade the fragment based on the combined shadow state value.

18. An apparatus for antialiasing a shadow, comprising:
memory for storing shadow map data and shadow map coordinate displacement data;
a texture unit configured to read a portion of the shadow map coordinate displacement data and to read a portion of the shadow map data from the memory using the portion of the shadow map coordinate displacement data read; and
a compare unit configured to compare the portion of the shadow map data read to fragment light view depth data received and to produce one or more shadow state values.

19. The apparatus of claim 18, further comprising a programmable computation unit configured to modify the portion of shadow map coordinate displacement data read.

20. The apparatus of claim 18, further comprising a combine unit configured to combine the one or more shadow state values to produce a combined shadow state value.

21. The apparatus of claim 20, further comprising a shading unit configured to shade fragment data at least partially responsive to the combined shadow state value.

22. The apparatus of claim 18, further comprising a shading unit configured to shade fragment data at least partially responsive to the one or more shadow state values.

23. The apparatus of claim 18, further comprising a jitter map coordinate computation unit.

24. The apparatus of claim 23, wherein the jitter map coordinate computation unit comprises:
at least one transform unit configured to receive object space jitter map coordinates and produce at least one of eye space jitter map coordinates or normalized device space jitter map coordinates; and
a scale unit configured to scale the normalized device space jitter map coordinates and produce jitter map coordinates for accessing the shadow map coordinate displacement data.

25. The apparatus of claim 18, wherein the shadow map coordinate displacement data includes pseudo-random shadow map coordinate displacements.

26. The apparatus of claim 18, wherein the shadow map coordinate displacement data includes user-determined shadow map coordinate displacements.

27. An apparatus for antialiasing a shadow, comprising:
    means for reading shadow map coordinate displacement data using jitter map coordinates stored in a memory;
    means for computing addresses to read shadow map data from the memory using a portion of the shadow map coordinate displacement data;
    means for reading the shadow map data stored in the memory to obtain shadow map depths; and
    means for comparing the shadow map depths to fragment depth data to produce one or more shadow state values.

28. An apparatus of claim 27, further comprising means for modifying a portion of shadow map coordinate displacement data.

29. An apparatus of claim 27, further comprising means for combining the one or more shadow state values to produce a combined shadow state value.

30. The apparatus of claim 29, further comprising means for shading fragment data at least partially responsive to the combined shadow state value.

31. An apparatus of claim 27, further comprising means for producing jitter map coordinates for accessing the shadow map coordinate displacement data stored in the memory.

32. The apparatus of claim 27, wherein each of the jitter map coordinates is scaled by a viewport dimension and a jitter map dimension.

33. A computing system comprising:
    a host processor;
    a host memory, the host memory storing programs for the host processor;
    a system interface configured to interface with the host processor; and
    a programmable graphics processor, including:
        memory for storing shadow map data and shadow map coordinate displacement data;
        a fragment shader configured to read a portion of the shadow map coordinate displacement data, based on jitter map coordinates, and to read a portion of the shadow map data from the memory using the portion of the shadow map coordinate displacement data read, the fragment shader being configured to produce one or more shadow state values by comparing the portion of the shadow map data read and fragment light view depth values.

34. The computing system of claim 33, wherein the fragment shader is configured to shade fragment data at least partially responsive to the one or more shadow state values.

35. The apparatus of claim 33, wherein each of the jitter map coordinates is scaled by a viewport dimension and a jitter map dimension.

* * * * *